United States Patent Office.

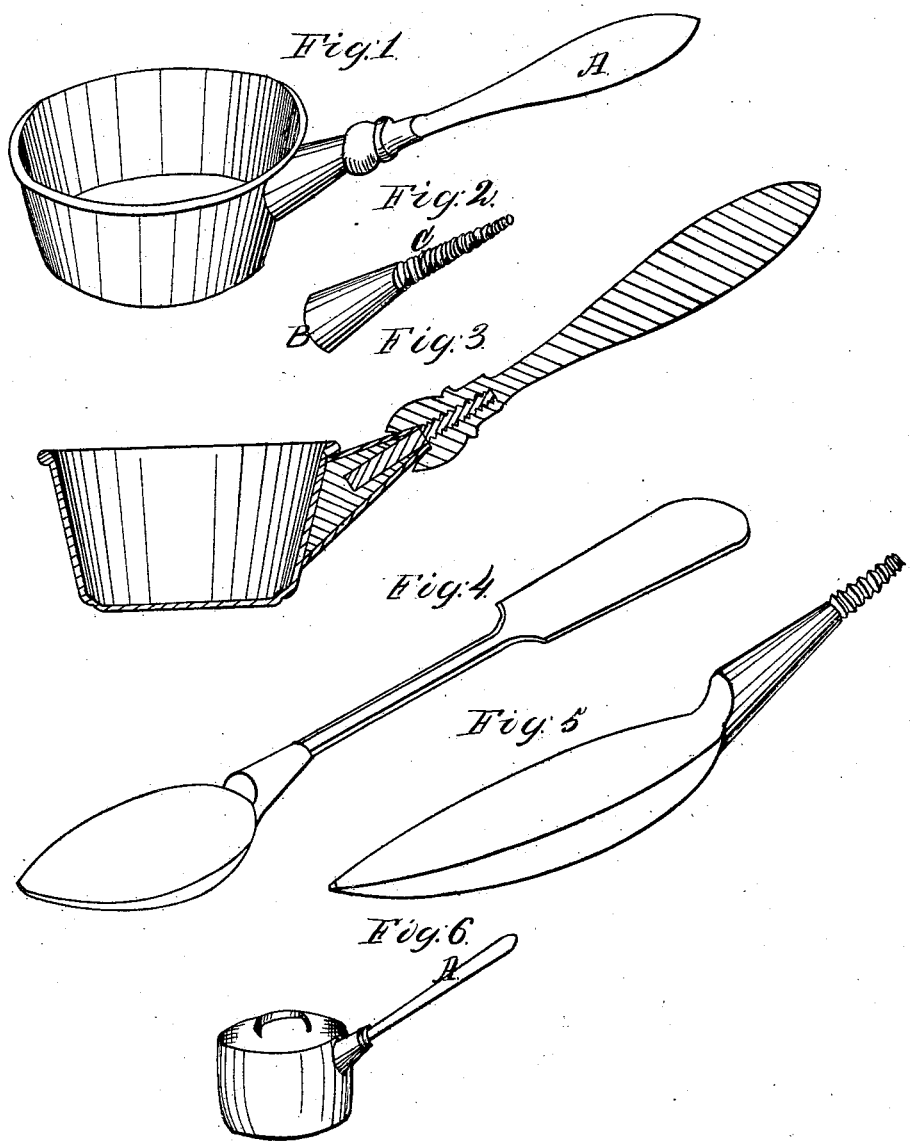

EZRA RIPLEY, OF TROY, NEW YORK.

Letters Patent No. 81,111, dated August 18, 1868.

IMPROVEMENT IN SCREW-HANDLE ATTACHMENT.

*The Schedule referred to in these Letters Patent and making part of the same.*

TO ALL WHOM IT MAY CONCERN:

Be it known that I, EZRA RIPLEY, of the city of Troy, in the county of Rensselaer, and State of New York, have invented a certain new and improved "Conical Shank and Screw-Handle Attachment;" and I do hereby declare that the following is a full, clear, and exact description of the same, reference being hereby had to the accompanying drawings, which form and make a part of this specification.

Like letters represent and refer to like or corresponding parts.

Figure 1 is a perspective view of a pan or culinary vessel having the handle A attached thereto by means of my said improvement, more fully hereinafter described and set forth.

Figure 2 is a view of the conical shank B, with the screw C at one end thereof, which said shank and screw serve to connect the vessel and handle A, substantially in the manner hereinafter described and set forth.

Figure 3 is a cross-section of fig. 1, more clearly showing the construction and application of my said invention, as hereinafter described.

Figure 4 is a spoon-bowl, with a shank and screw-handle attachment, which said spoon-bowl I anticipate making of pressed glass, pressed into form by the usual method of pressing glassware.

Figure 5 is a spoon-bowl and shank, with the handle A disconnected from the same; and Figure 6 is a view of a stew-pan having the handle A attached thereto by means of my said improved conical shank and screw-handle attachment, more fully hereinafter described and set forth.

The nature of my said invention and improvements consists in the employment of a conical shank, B, with a screw, C, at one end thereof, made of any metal or other material desired, one end of which may be soldered or otherwise fastened to the body of earthen, porcelain, or glass culinary vessels, while, by means of the screw C at the other end, any wooden or other handle may be securely fastened to the same, substantially in the manner and by the means hereinafter described and set forth.

To enable others skilled in the art to which my invention relates to make and use the same, I will here proceed to describe the construction and operation of the same, which are as follows, to wit:

The shank B is made conical in shape, and of any size deemed best, and it may be fastened to the bowl, spoon, or other culinary vessel, in any manner thought best.

I design making spoons and other like articles of glass or porcelain, and to which said ware the said shank B may be readily attached, by soldering or otherwise.

The screw-end C of the shank B may be of any length desired, and is screwed into the handle which it is desired to attach to said spoon or other vessel.

The handle A may be made of wood, or any other material desired, and is attached to the spoon or other vessel in the manner hereinbefore described.

Having thus described the nature of my said invention and improvements, what I claim as my invention, and desire to secure by Letters Patent of the United States, is—

The conical shank B, or its equivalent, having the screw C on one end thereof, for the purposes of connecting wooden or other handles to spoons, bowls, or other culinary vessels, substantially in the manner and for the purposes herein described and set forth.

In testimony whereof, I have hereunto set my hand, this 18th day of October, A. D. 1867.

EZRA RIPLEY.

Witnesses:
CHARLES D. KELLUM,
WILLIAM FALY.